United States Patent [19]
van der Does

[11] 3,743,276
[45] July 3, 1973

[54] DEVICE FOR DELIVERING INDIVIDUAL SHEETS OF FILM FROM A STACK

[75] Inventor: Lucas van der Does, Delft, Netherlands

[73] Assignee: N.V. Optische Industrie "De Oude Delft", Delft, Netherlands

[22] Filed: June 13, 1972

[21] Appl. No.: 262,298

[30] Foreign Application Priority Data
June 17, 1971 Netherlands .................... 7108305

[52] U.S. Cl. .............................................. 271/24
[51] Int. Cl. ............................................ B65h 3/02
[58] Field of Search ............ 271/24, 16, 17, 19–23, 271/25

[56] References Cited
UNITED STATES PATENTS
3,572,691  3/1971  Heinricy ............................... 271/23
3,578,312  5/1971  Kocourek ......................... 271/24 X Primary Examiner—Harvey C. Hornsby
Assistant Examiner—James W. Miller
Attorney—Arthur B. Colvin

[57] ABSTRACT

In a device for delivering individual sheets of film from a stack to a conveyor, means are provided to bulge the uppermost sheet of film and to separate the bulged sheet from the stack, the sheet being brought within the reach of the conveyor.

5 Claims, 5 Drawing Figures

Patented July 3, 1973

3,743,276

DEVICE FOR DELIVERING INDIVIDUAL SHEETS OF FILM FROM A STACK

The invention relates to a device for delivering individual sheets of film, for example separate rectangular film sheets, from a stack to a conveyor which stack is incorporated in a supply magazine that can be attached to the said device, this supply magazine having on its upper side a delivery aperture for delivery of the sheets and being furthermore provided with a curved pressure plate which keeps the stack pressed under spring pressure, both against the upper side of the supply magazine and against the retaining members acting upon the uppermost sheet, at least one of which retaining members is a pressure member that can move to and fro near one side of the stack of sheets, which pressure member can be driven by the device and can then push one edge of the uppermost sheet over its entire breadth in the direction of the opposite edge, as a result of which the uppermost sheet is released from the stack over a part of its surface.

In known devices of this kind as disclosed in the German Patent specification No. 82,431 and in the Dutch pre-published Patent application No. 7 003 121 there are two pressure members situated one on either side of the stack of film sheets. During their active movement these pressure members press the side edges of the uppermost sheet toward each other, as a result of which this sheet is caused to bulge transversely to the direction of delivery. In this way the possibility is afforded of gripping the front or rear edge of the sheet of film that has thus become bulged, using a slide which is provided with a gripping member or hook and which then pushes or pulls the sheet out of the supply magazine.

With these prior-art devices the conveyor is periodically moved up to the bulged sheet, which operation calls for a separate construction within the device. In the as yet unpublished Dutch application No. 7 100 002 of applicant a device is described in which the conveyor is permanently mounted, the sheets to be conveyed being bulged in the direction of delivery by means of a pusher after which a blocking member opposite the pusher is removed so that the sheet can extend freely in the direction of delivery and come within reach of the conveyors. In this way the resillience of the material of the sheets themselves is used, a feature which results in a greatly simplified construction of the device. However, with this device two actions must invariably be performed before a sheet of film can be removed from the stack. First of all, the pressure plate on which the stack rests must be pressed down in order to release the uppermost sheet of film from the retaining members. Furthermore this apparatus is not so well adapted for unexposed sheets of film, as the supply magazine is a component which is firmly fixed to the device and cannot easily be made light-tight because of the arrangement of the separating members.

The invention aims at the elimination of these drawbacks. To this end, a device according to the invention is characterized in that, over the delivery aperture of the attached supply magazine and on either side of the stack of sheets of film, means are provided which, under the control of a cam disk, pull the bulged uppermost sheet further upwards from the stack until the pushed-up edge of the uppermost sheet jumps out of the storage magazine over one edge of the delivery aperture, this being effected in such a manner that the sheet remains bulged, after which the means are removed from underneath this sheet so that the sheet can extend freely in the direction of delivery and hereby come within reach of the conveyor.

In a preferred embodiment of the device according to the invention these means consist of spring loaded hooks rotatable about an axis which is parallel to the direction of delivery of the sheets, which hooks are fixed to the ends of rockers which cause the hooks to perform an synchronous up and-down movement under the control of a cam disk in such a way that toward the end of the upward movement a projecting part of each hook strikes against a fixed buffer, as a result of which the hooks turn outwards against the action of a spring from underneath the sheet of film.

Furthermore, in this preferred embodiment of the device according to the invention the conveyor is formed by a set of conveyance rollers interacting with each other and having different diameters, the roller with the smallest diameter being mounted between the supply magazine and the roller with the larger diameter, its position being such that the pushed-up edge of the uppermost sheet of film is pressed by the pulling means against the large conveyance roller and parallel to its axis of rotation.

The invention will now be described in detail by reference to the drawing for a case where the sheet material consists of film.

Figure 2:
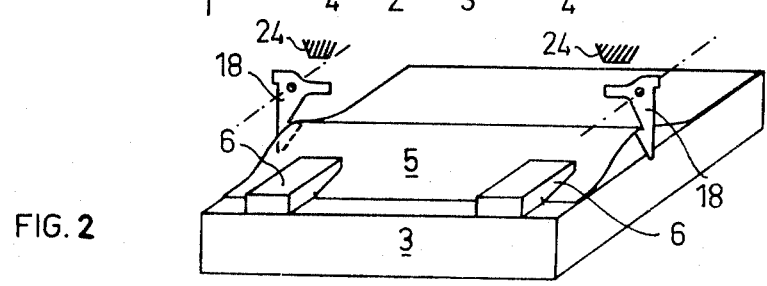
FIG. 2 depicts a situation in which the hooks on either side of the stack lift up the uppermost sheet of film from the stack.
Figure 3:
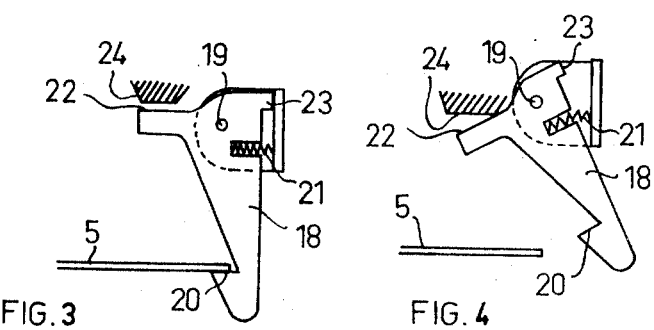

FIG. 3 gives a more detailed view of a hook according to FIG. 2.

Figure 4:
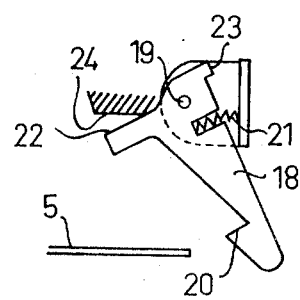

FIG. 4 shows the same hooks as in FIG. 3 in a different phase of operation.

Figure 1:
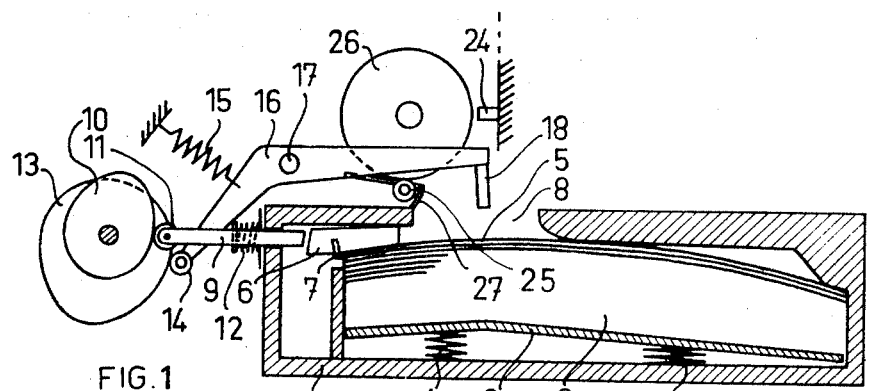
FIG. 1 shows in outline a longitudinal cross-section of the supply magazine and the separating device.
Figure 5:
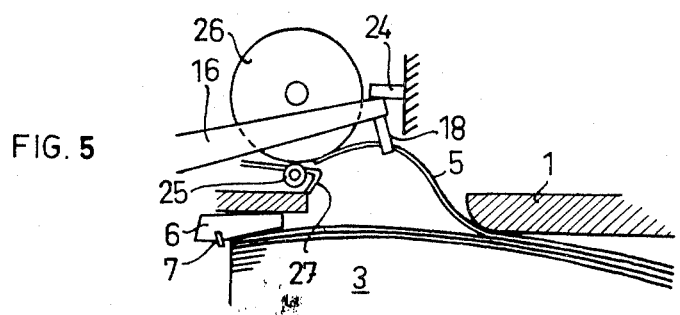

FIG. 5 shows partly the cross-section as in FIG. 1 in a different phase of the film delivery process.

In FIG. 1 the supply magazine is indicated at 1, the magazine having a somewhat curved pressure plate 2 upon which the stack of sheets of film 3 is placed. Under the action of the compression spring 4, the uppermost sheet of film 5 of stack 3 presses against the inner side of the upper face of the supply magazine and against the retaining members 6. The latter have the form of pushers capable of moving to and fro and having a knife edge 7 by means of which, during the active movement of the pushers 6, one edge of the uppermost sheet of film 5 is pushed toward the delivery aperture 8 of the supply magazine 1, as a result of which the film becomes bulged. The knife-edges 7 project slightly less than the thickness of a sheet of film. The pushers are controlled via the pusher rods 9 by a driven cam disk 10 which cooperates with a roller 11 and a compression spring 12. Mounted on the same axis of the cam disk 10 is another cam disk 13 which, acting via a roller 14 and in cooperation with a spring 15, controls the rockers 16. These rockers, which can rotate about an axis 17, have their other end over the delivery aperture 8 of the supply magazine. Fixed to each of these ends is a spring loaded hook 18 which can rotate about an axis 19 extending parallel to the direction of the to-and-fro movement of pushers 6. Each of the hooks 18 overhangs one edge of the stack of film sheets 3.

These hooks are further depicted in FIG. 2 as they appear when in operation.

FIGS. 3 and 4 show the mode of operation of hooks 18. These hooks have a nose 20 by means of which the uppermost film sheet 5 can be pulled upwards. A spring 21 ensures the vertical positioning of hook 18. The hook has furthermore a buffer surface 22 and a cam 23. When the uppermost sheet 5 has been lifted to a sufficient height and is thereby caused to pass with its pushed-up edge, via a ledge 27, over the edge of the delivery aperture 8 and is pulled out of the supply magazine, this sheet must be able to stretch in order to come within reach of the conveyor roller system 25 and 26 (see FIG. 1). This is effected by making hooks 18 turn outwards from under this sheet as a result of collision of buffer surface 22 with a fixed buffer 24. Because of the fact that the end of the rocker continues to move upwards, hook 18 is then forced to turn away against the spring action of spring 21, thereby releasing the film sheet 5. Cam 23 serves to provide space for turning. Ledge 27 obviates the possibility that the corners of the pushed-up edge of the uppermost sheet of film might be the first to be withdrawn from supply magazine 1, in which case this sheet of film could slip off the hooks 18. Now, the uppermost sheet of film remains bulged throughout the upward movement of hooks 18, and its edge as a whole is at the same time pulled out of the supply magazine 1.

This phase of the film delivering process is shown in FIG. 5, in which the pushed-up edge of the uppermost sheet of film has been pulled out of the delivery aperture 8 of the supply magazine 1 and is held by hooks 18 against the surface of the large conveyance roller 26. As soon as hooks 18 are turned away, the still bulged sheet of film 5 is caused to extend by its own resillience, thereby bringing it within reach of the two conveyance rollers 25 and 26.

What I claim is:

1. A device for delivering individual sheets of film from a stack to a conveyor, which stack is incorporated in a supply magazine that can be attached to the said device, this supply magazine having on its upper side a delivery aperture for delivery of the sheets of film and being furthermore provided with a somewhat curved pressure plate which keeps the stack pressed under spring force both against the upper side of the supply magazine and against the retaining members acting upon the uppermost sheet of film, at least one of which retaining members is a pressure member that can move to and fro near one side of the stack of sheets of film, which pressure member can be driven by the device and can then push one edge of the uppermost sheet of film over its entire breadth in the direction of the opposite edge, as a result of which the uppermost sheet of film is released from the stack over part of its surface, characterized in that, over the delivery aperture of the attached supply magazine and on either side of the stack of sheets of film, means are provided which, under the control of a cam disk, pull the bulged uppermost sheet of film further upwards from the stack until the pushed-up edge of the uppermost sheet of film jumps out of the supply magazine over one edge of the delivery aperture, this being effected in such a manner that the sheet of film remains bulged, after which the means are removed from underneath this sheet of film so that the sheet can extend freely in the direction of delivery and thereby come within reach of the conveyor.

2. A device according to claim 1, characterized in that the means consist of spring loaded hooks each of which is rotatable about an axis parallel to the direction of delivery of the sheets of film, which hooks are fixed to the ends of rockers which cause the hooks to perform an synchronous up-and-down movement under the control of a cam disk in such a way that toward the end of the upward movement a projecting part of each hook strikes against a fixed buffer, as a result of which the hooks turn outwards against the action of a spring from under the lifted sheet.

3. A device according to claim 1, characterized in that the conveyor is formed by a set of cooperating conveyance rollers.

4. A device according to claim 1, characterized in that the conveyance rollers have different diameters.

5. A device according to claim 4, characterized in that the conveyance roller with the smallest diameter is positioned between the supply magazine and the roller with the greatest diameter in such a manner that the edge in the direction of the uppermost sheet of film is pressed by the pulling means against the large conveyance roller in a direction parallel to the axis of rotation of the latter.

* * * * *